United States Patent
Raghuprasad (10) Patent No.: US 11,502,545 B2
(45) Date of Patent: Nov. 15, 2022

(54) WATCH CHARGING ASSEMBLY

(71) Applicant: Puthalath Koroth Raghuprasad, Odessa, TX (US)

(72) Inventor: Puthalath Koroth Raghuprasad, Odessa, TX (US)

( * ) Notice: Subject to any disclaimer, the term of this patent is extended or adjusted under 35 U.S.C. 154(b) by 311 days.

(21) Appl. No.: 16/887,581

(22) Filed: May 29, 2020

(65) Prior Publication Data

US 2021/0373505 A1 Dec. 2, 2021

(51) Int. Cl.

| | |
|---|---|
| *H02J 50/00* | (2016.01) |
| *H02J 50/10* | (2016.01) |
| *G04G 17/04* | (2006.01) |
| *H02J 7/02* | (2016.01) |
| *G04G 19/00* | (2006.01) |
| *H01F 27/28* | (2006.01) |
| *G04C 10/00* | (2006.01) |
| *H01F 38/14* | (2006.01) |

(52) U.S. Cl.
CPC .............. *H02J 50/10* (2016.02); *G04C 10/00* (2013.01); *G04G 17/04* (2013.01); *G04G 19/00* (2013.01); *H01F 27/2871* (2013.01); *H01F 38/14* (2013.01); *H02J 7/02* (2013.01)

(58) Field of Classification Search
CPC . H02J 50/10; H02J 50/005; H02J 7/02; G04C 10/00; G04G 17/04; G04G 19/00; H01F 27/2871; H01F 38/14
See application file for complete search history.

(56) References Cited

U.S. PATENT DOCUMENTS

| | | | |
|---|---|---|---|
| 2,892,412 A | 6/1959 | Mullins et al. | |
| 4,510,939 A | 4/1985 | Brenman et al. | |
| 4,765,343 A | 8/1988 | Brenman et al. | |
| (Continued) | | | |

FOREIGN PATENT DOCUMENTS

| | | | | |
|---|---|---|---|---|
| CA | 2956328 C | * | 1/2021 | ............... A61B 5/01 |
| CN | 100385232 C | * | 4/2008 | ........... A61B 5/0031 |
| (Continued) | | | | |

OTHER PUBLICATIONS

Chen; "Your body is a big battery and scientists want to power gadgets with it"; The Verge; Jan. 15, 2020; https://www.theverge.com/2017/7/5/15922172/self-powered-electronics-health-thermoelectric-generation.

(Continued)

*Primary Examiner* — Naum Levin
(74) *Attorney, Agent, or Firm* — David L. King (57) ABSTRACT

A watch charging assembly 10 has a coil 22, a membrane 24 and a back plate 12. The coil 22 is configured to pass electric current received at a first or second contact pad 27, 28. The membrane 24 is affixed to the coil 22 forming a membrane and coil assembly 20. The back plate 12 has a pair of conductive inserts 30. Each conductive insert 30 is aligned with and contacts each contact pad 27, 28. The back plate 12 with the coil 22 and membrane 24 form the charging assembly 10. The charging assembly 10 is configured to form a bottom or underside or, alternatively, be attached to a bottom or underside of a rechargeable battery operated wristwatch 100 and when worn, the charging assembly 10 receives electric current from the wearer to charge a rechargeable battery of the wristwatch 100. The coil 22 can be a pancake coil.

18 Claims, 14 Drawing Sheets

(56) References Cited

U.S. PATENT DOCUMENTS

| | | | |
|---|---|---|---|
| 6,016,451 | A | 1/2000 | Sanchez-Rodarte |
| 6,415,176 | B1 | 7/2002 | Farringdon et al. |
| 7,107,103 | B2 | 9/2006 | Mandell et al. |
| 7,183,693 | B2 | 2/2007 | Pearce |
| 9,480,846 | B2 * | 11/2016 | Strother .................. H02J 50/90 |
| 9,770,185 | B2 * | 9/2017 | Wheeler .............. A61B 5/0533 |
| 9,790,928 | B2 | 10/2017 | Bai et al. |
| 9,887,644 | B2 | 2/2018 | Hong et al. |
| 10,122,183 | B2 | 11/2018 | An et al. |
| 10,258,804 | B2 | 4/2019 | Paralikar et al. |
| 10,485,478 | B1 * | 11/2019 | Mirov ................ A61B 5/14551 |
| 11,211,975 | B2 * | 12/2021 | Partovi ................... H01F 38/14 |
| 2009/0082835 | A1 * | 3/2009 | Jaax ..................... A61N 1/3787 607/61 |
| 2013/0176401 | A1 * | 7/2013 | Monari .................. H04N 5/222 348/157 |
| 2013/0338470 | A1 | 12/2013 | Ouwerkerk |
| 2021/0015604 | A1 * | 1/2021 | Ma ....................... A61F 2/1635 |

FOREIGN PATENT DOCUMENTS

| | | | | |
|---|---|---|---|---|
| CN | 106999083 | A * | 8/2017 | ........... A61B 5/0059 |
| CN | 107276197 | | 10/2017 | |
| CN | 107920742 | A * | 4/2018 | ........... A61B 5/0006 |
| WO | WO-2011049924 | A2 * | 4/2011 | ........... A61F 2/4465 |

OTHER PUBLICATIONS

Anthony; "Will your body be the battery of the future?" Sep. 5, 2012.

Zyga; "Self-powered e-watch is powered completely by wrist movements"; Phys.org Nov. 23, 2015.

"Team develops thermoelectric device that generates electricity using human body heat"; Mar. 1, 2019 ; Phys.Org https://phys.org/news/2019-03-team-thermoelectric-device-electricity-human.html.

* cited by examiner

WATCH CHARGING ASSEMBLY

TECHNICAL FIELD

The present invention relates to a watch charging assembly. More particularly, the assembly is powered by electricity derived from the wearer of the device.

BACKGROUND OF THE INVENTION

Several manufacturers of mobile or cellular phones called smart phones have developed smart watches. These watches, like smart phones, have been designed to be wirelessly recharged using inductive coils. The problem with all rechargeable battery-operated devices is maintaining a "charge".

The present invention described below provides a unique charging assembly for smart watches wherein the wearer of the watch becomes a source, if not the source, of electrical recharging to supplement the expected life of a battery charge. The principle behind the invention is the circuit of electrical potential generated by all bodily functions in human beings. Thus, all cells, tissues and organs both generate electricity and utilize it to transmit signals to and from periphery to the nervous system control centers, as well as almost all bodily functions. As described hereinafter, this invention anticipates that this constant supply of electrical potential can be tapped to "top off" charge of the battery inside the smart watch. In this concept, provision has been made to gain close and constant contact with the skin of the wearer, draw the available electrical potential through a "pancake tesla coil" to convert such electricity to magnetic fluxes, which are then used to engage electricity to be stowed within the battery of the smart watch.

SUMMARY OF THE INVENTION

A watch charging assembly has a coil, a membrane and a back plate. The coil is configured to pass electric current received at a first or second contact pad. The membrane is affixed to the coil. The back plate has a pair of conductive inserts. Each conductive insert is aligned with and contacts each contact pad. The back plate with the coil and membrane form the charging assembly. The charging assembly is configured to be attached to a bottom or underside of a rechargeable battery operated wristwatch and when worn, the charging assembly receives electric current from the wearer to charge the rechargeable battery of the wristwatch. The coil can be a pancake coil. The coil extends through a first pass through connection on a first side of the membrane. The coil passes through the first pass through connection and extends to the first contact pad from the first pass through connection on a coil side of the membrane. The coil is spirally wound from the first pass through connection on the coil side of the membrane to a second pass through connection on the coil side of the membrane at the second contact pad.

The membrane is affixed to the back plate. The membrane can be glued to the back plate or optionally sonically welded to the back plate.

In one embodiment, the watch charging assembly has a plurality of magnets configured to be positioned in the back plate along a periphery of the back plate to hold the charging assembly to the bottom or underside of a watch magnetically. In a second embodiment, the watch charging assembly has a plurality of elastomeric suction cups configured to hold the charging assembly to the bottom or underside of the watch by vacuum when the suction cups are compressed against the watch. In a third embodiment, the bottom plate of the watch charging assembly has a plurality of snap clips around an edge of the bottom plate configured to be attached to a watch with edges or grooves configured to receive the snap clips to attach the assembly to the watch.

In all these embodiments, the back plate has a pair of holes for receiving the conductive inserts, each hole sized to receive one of the conductive inserts. Each conductive insert has a non-metal housing extending around a perimeter of the conductive insert and configured to fit into the holes of the back plate, and a metal conductive portion configured to contact a wearer's skin. The metal conductive portion has a plurality of pins, each pin projecting from the metal portion to a tip end to increase contact intensity at the skin. The pins of the plurality of pins are closely spaced to share the contact pressure at the skin. Preferably, the coil is hermetically sealed in the membrane. The contact pads of the coil are engaged and in contact with the metal portion of the conductive inserts to pass electric current into the coil. The metal conductive portion of the inserts is made of highly conductive metal. The highly conductive metal is one of copper, gold, gold plated metal, silver or other conductive metallic material. The back plate is made of non-conductive plastic. The charging assembly is configured to attach to a smart wristwatch configured to be wirelessly charged by a coil.

A watch with a built-in charging assembly has a watch with a rechargeable battery and configured to be recharged through an inductive coil and a watch charging assembly. The watch charging assembly has a coil configured to pass electric current received at a first or second contact pad; a membrane affixed to the coil; a back plate having a pair of conductive inserts, each conductive insert aligned with and contacting each contact pad, the back plate with the coil and membrane form the charging assembly; and wherein the charging assembly is configured to be attached to a bottom or underside of a rechargeable battery operated wristwatch and when worn, the charging assembly receives electric current from the wearer to charge the rechargeable battery of the wristwatch continuously while the user wears the watch.

BRIEF DESCRIPTION OF THE DRAWINGS

The invention will be described by way of example and with reference to the accompanying drawings in which.

DETAILED DESCRIPTION OF THE INVENTION

Figures 1, 2:
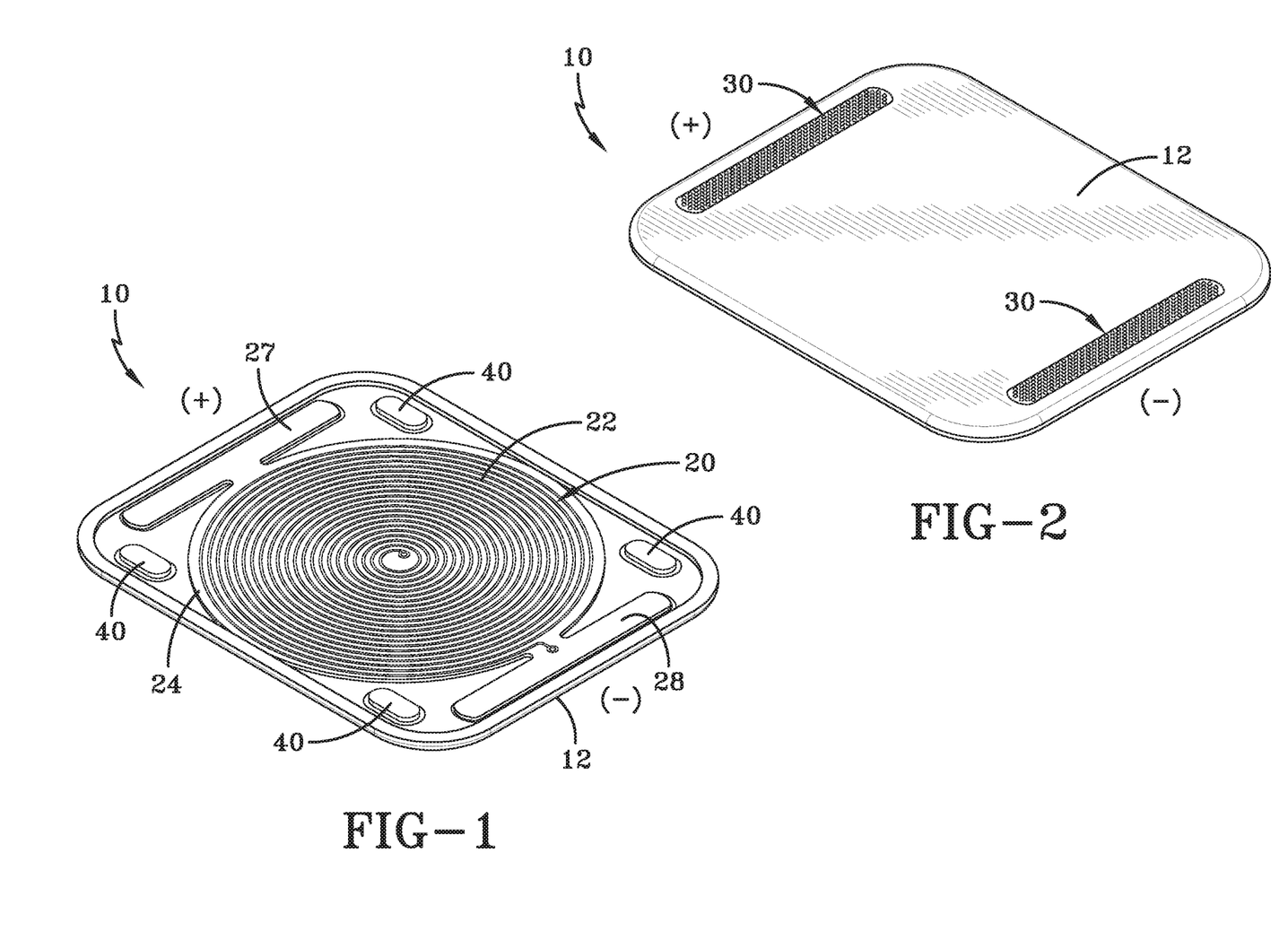
FIG. 1 is a perspective view of the watch charging device assembly of the present invention according to a first embodiment of the invention.
FIG. 2 is a perspective view of the opposite side of the charging device assembly of the present invention taken from FIG. 1.

With reference to FIGS. 1-8, a watch charging assembly according to the present invention is illustrated. Throughout the figures, a (+) and (−) symbol represent a positive and negative direction of the electric current flow used to charge a watch battery. With reference to FIG. 1, the watch charging assembly 10 is shown having a coil and membrane assembly 20 configured to pass electric current received at a first or second contact pad 27, 28. The coil 22 is affixed to a membrane 24 forming the coil and membrane assembly 20, the membrane 24 is extremely thin as is the coil 22 and has a very low profile in terms of thickness. The coil and membrane assembly 20 is then placed in a back plate 12 having a pair of conductive inserts 30. Each conductive insert 30 contacts a contact pad 27, 28. The back plate 12 with the coil and membrane assembly 20 form the charging assembly 10. The charging assembly 10 is configured to be attached to a bottom or underside of a rechargeable battery operated wristwatch and when worn, the charging assembly 10 receives electric current from the wearer to slowly and continuously recharge the rechargeable battery of the wristwatch, similar to the "trickle charge" devices.

FIG. 2 illustrates the back plate 12 with the surface that would be against the wearer's wrist or skin. At each opposed end is a conductive insert 30.

Figure 3:
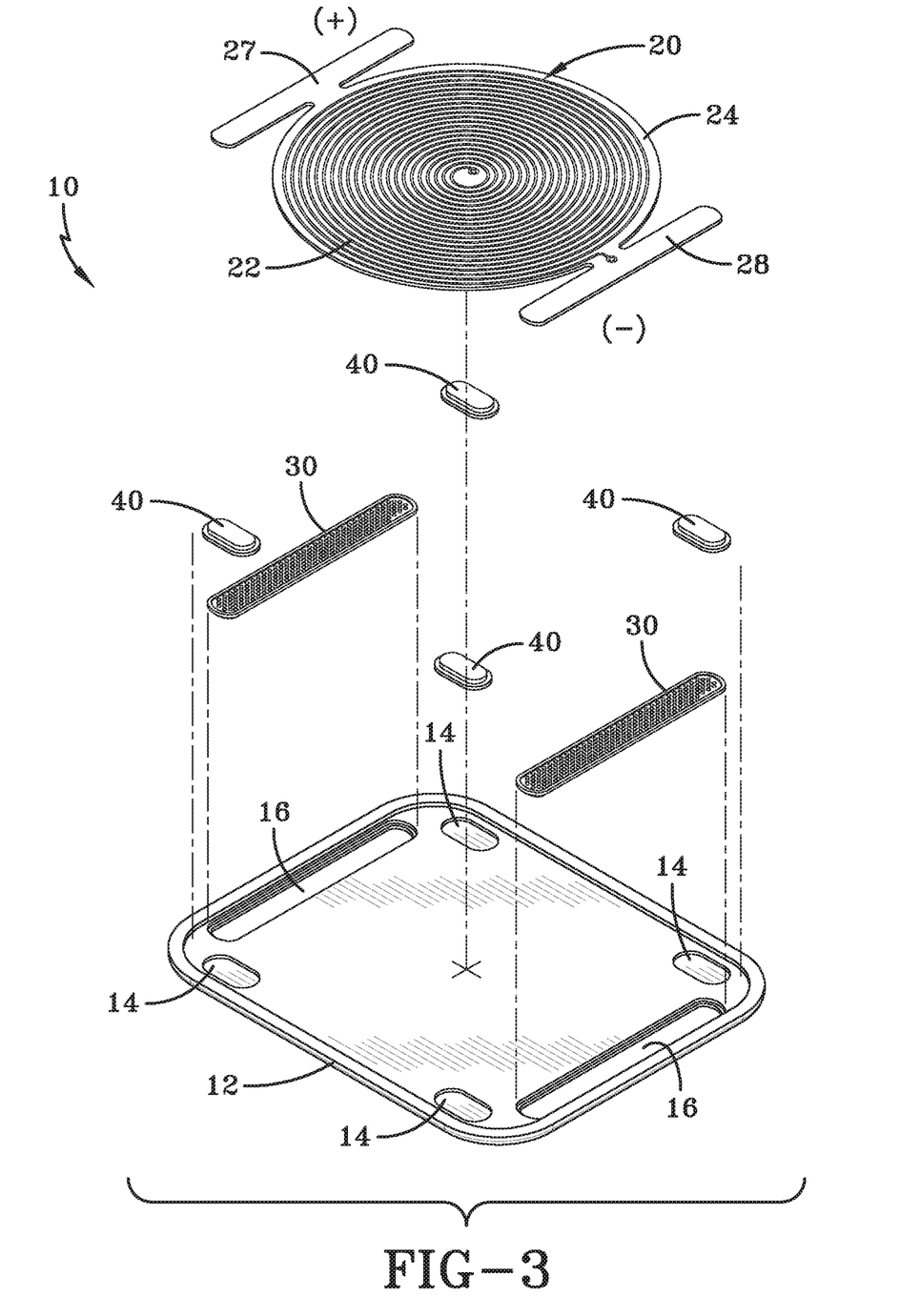
FIG. 3 is an exploded perspective view of the charging device assembly of the present invention according to the first embodiment.
Figure 4:
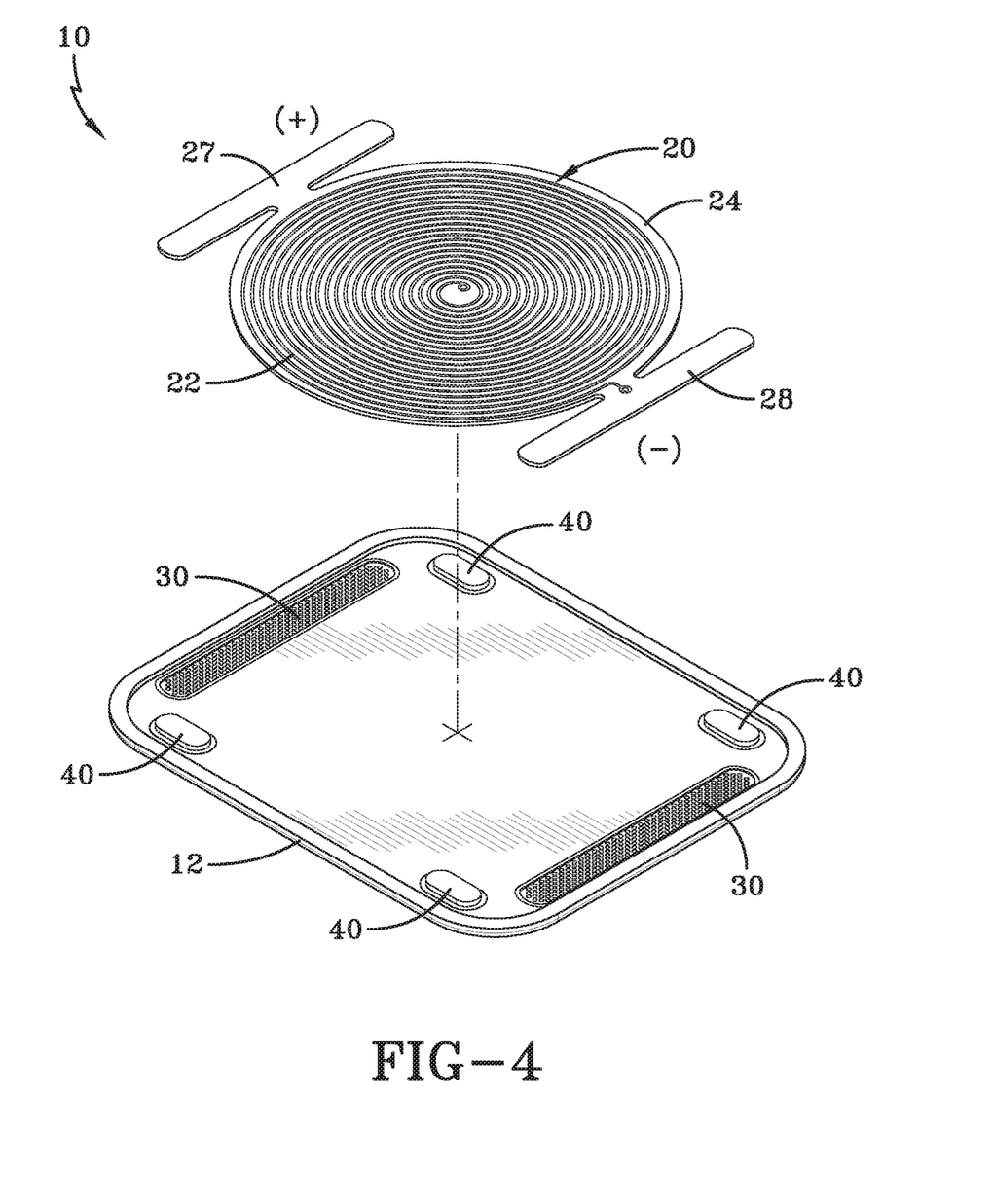
FIG. 4 illustrates how the coil and membrane assembly are positioned over and prior to being attached to the back plate by gluing or other means of attachment.

With reference to FIG. 3, the entire assembly is shown in an exploded view wherein the back plate 12 has four depressions 14 proximally at each corner. The four depressions 14 are configured to house a magnet 40 at these locations. As further shown, the conductive inserts 30 are positioned at each extreme and are configured to be held in the elongated slotted holes 16 at each end of the back plate 12. The membrane 24 with the coil 22 formed as an assembly 20 has a pair of contact pads 27, 28 at each extreme. These contact pads 27, 28 when positioned into the back plate 12 align themselves over the conductive inserts 30. This is further illustrated in FIG. 4 where the inserts 30 and magnets 40 are positioned in the back plate 12 and the membrane and coil assembly 20 is shown positioned directly above to be centered into the back plate 12 on assembly. Preferably, the membrane and coil assembly 20 is glued or otherwise affixed to the back plate 12. The back plate 12 can preferably be made of a plastic material and the membrane 24 can be heat-staked to the back plate 12 or glued as previously mentioned.

Figure 5:
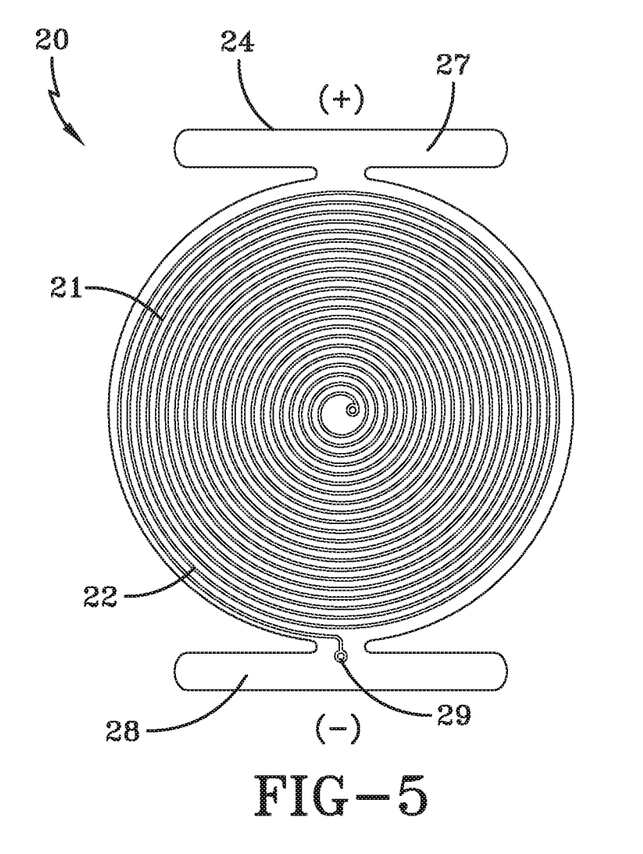
FIG. 5 is a plan view of the coil membrane assembly.
Figure 6:
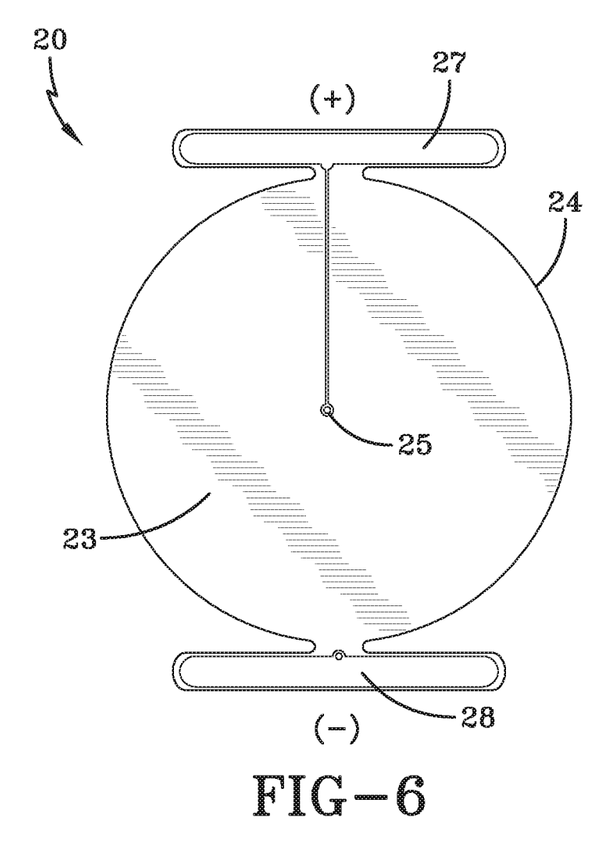
FIG. 6 is a plan view of an opposite side of the coil membrane assembly taken from FIG. 5.

An important aspect of the invention is how the membrane 24 and coil 22 are configured. The coil 22 shown in FIG. 5 is spirally wound from a center location outward to an outer location. As shown in FIG. 6, the coil wire extends through a first pass through connection 25 outward to the contact pad 27. It is from this location that the coil 22 then extends from the contact pad 27 to the first pass through connection 25 on the non-coil side 23 of the membrane 24 and the pass through 25 is offset slightly from the center to allow certain functions of the watch to which it would be attached so as to not be interfered with by the coil 22 itself. There is a large diametrical space provided for this purpose. From this location, the coil 22 spirally winds outwardly on the coil side 21 of the membrane 24 to the second pass through connection 29 where the coil extends through the second pass through connection 29 at the second contact pad 28. Accordingly, the coil 22 when positioned in the back plate 12 has the coil side 21 of the membrane 24 facing outwardly toward the watch to which it will be attached.

Figure 7:
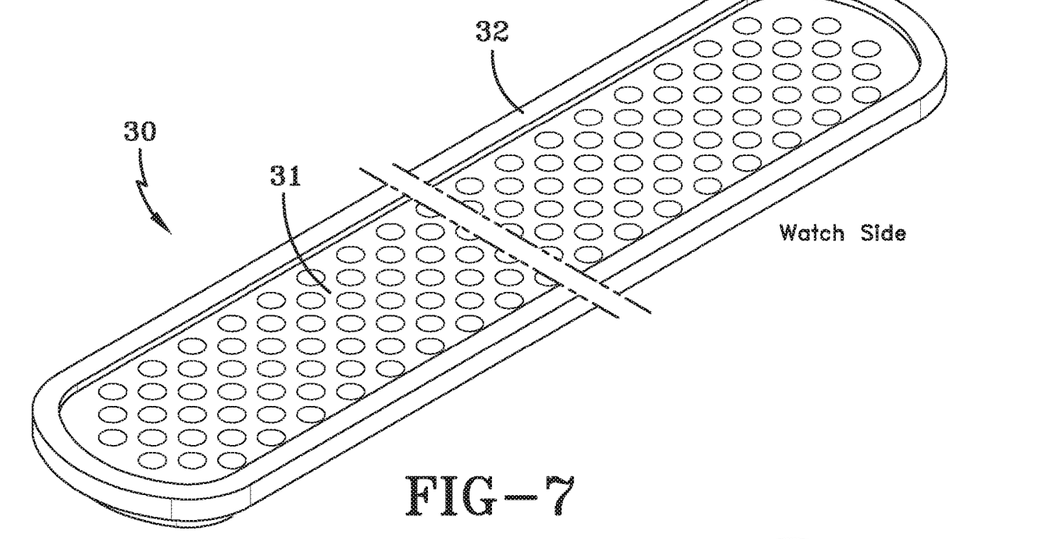
FIG. 7 is a perspective view of a conductive insert of the charging device assembly of the present invention.
Figure 8:
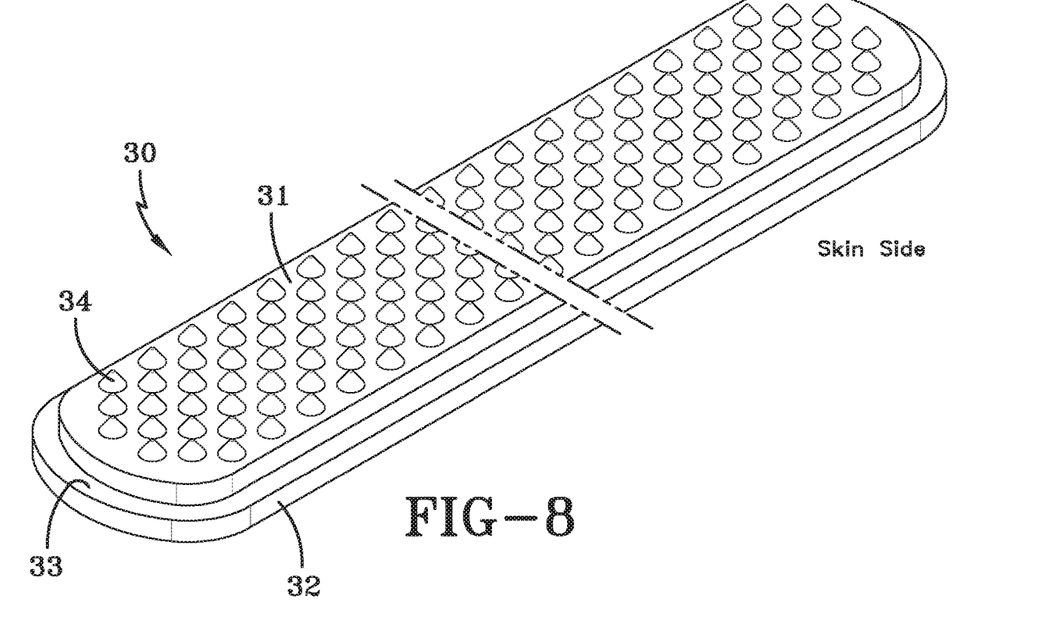
FIG. 8 is an opposite perspective of the conductive insert of FIG. 7 illustrating the plurality of protruding pins for engaging the skin of a wearer of the charging device assembly.

With reference to FIGS. 7 and 8, a conductive insert 30 is illustrated having a non-metal insert housing 31 and a metal conductive insert 33 enclosed in the non-metal housing 31. The insert has a plurality of pins 34 as shown in FIG. 8 that protrude outwardly. These pins 34 extend to a tip to provide a high contact pressure to their small size when pressed up against the skin of a wearer. To avoid discomfort, a plurality of these pins 34 are closely spaced such that the contact pressure is absorbed by multiples of these pins 34. This increased contact area ensures that good electrical conductivity is passed from the wearer into the metal insert 33 through the plurality of pins 34.

Figure 9:
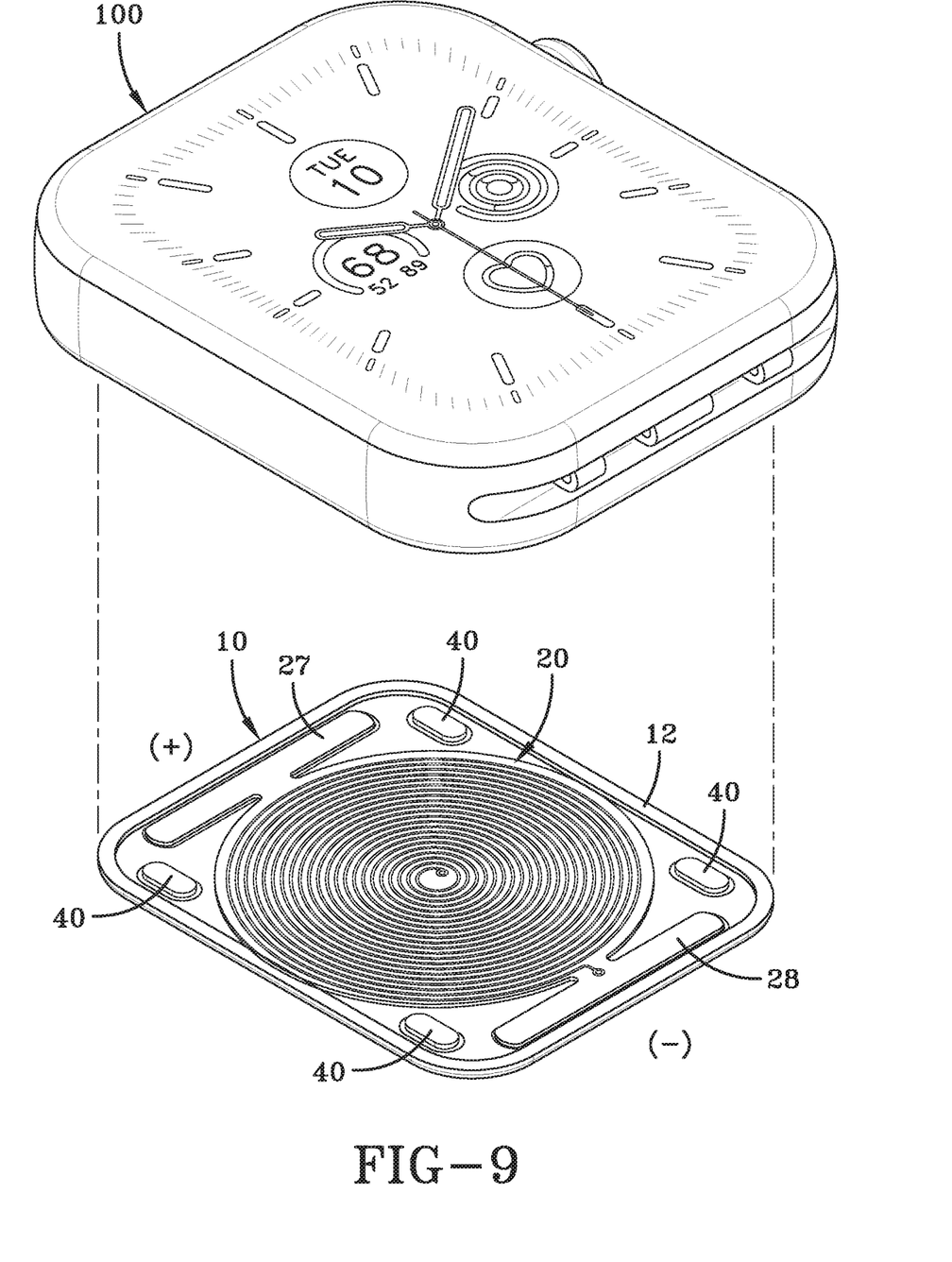
FIG. 9 is an exploded perspective view of an exemplary watch shown above the charging device assembly.
Figure 11:
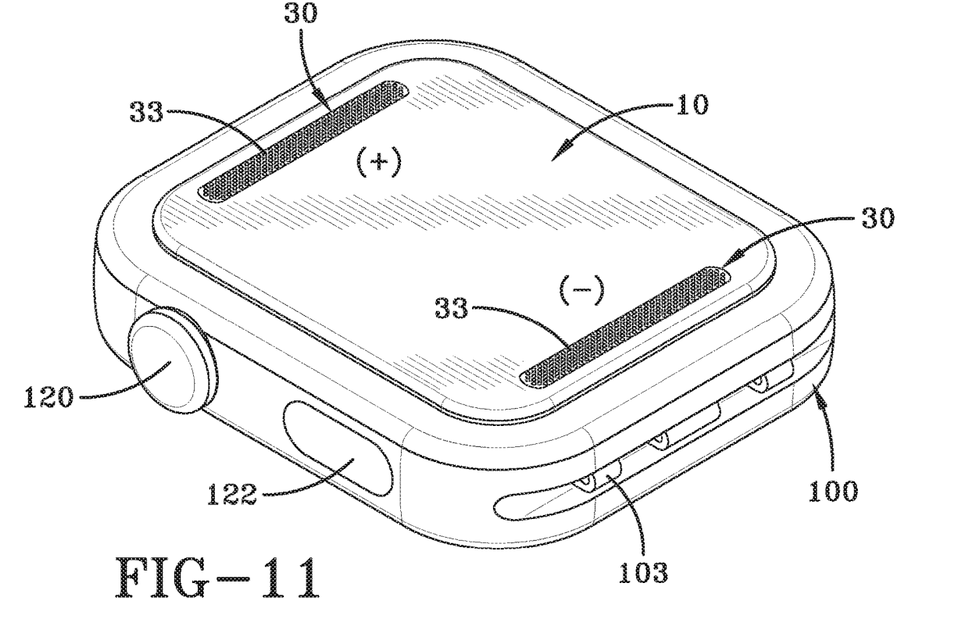
FIG. 11 is the perspective view taken from FIG. 10 of the underside or skin side of the watch with the charging device assembly attached.

When completely assembled, as shown in FIG. 9, the charging assembly 10 is configured to attach to an underside of a wristwatch 100, as illustrated. The wristwatch 100 as illustrated, has a face having hands 105, 106, 107, a calendar 111 at the 12 o'clock position, an option 116 at the 3 o'clock position, a heart rate measurement shown numerically 112 at the 9 o'clock position and the heart 114 at the 6 o'clock position when the watch is positioned to monitor the wearer's heart rate. These functions are achieved by pressing buttons as illustrated in FIG. 11 at locations 120 or 122 as are commonly found in such smart watches such as an IPHONE® watch or ANDROID® watch. It is possible that the face and display are projected through electrical illumination and are not physical components of the watch itself, per se, as is common with such smart watches. This is only one watch face available on some smart watches and is shown here simply as an example.

Figure 10:
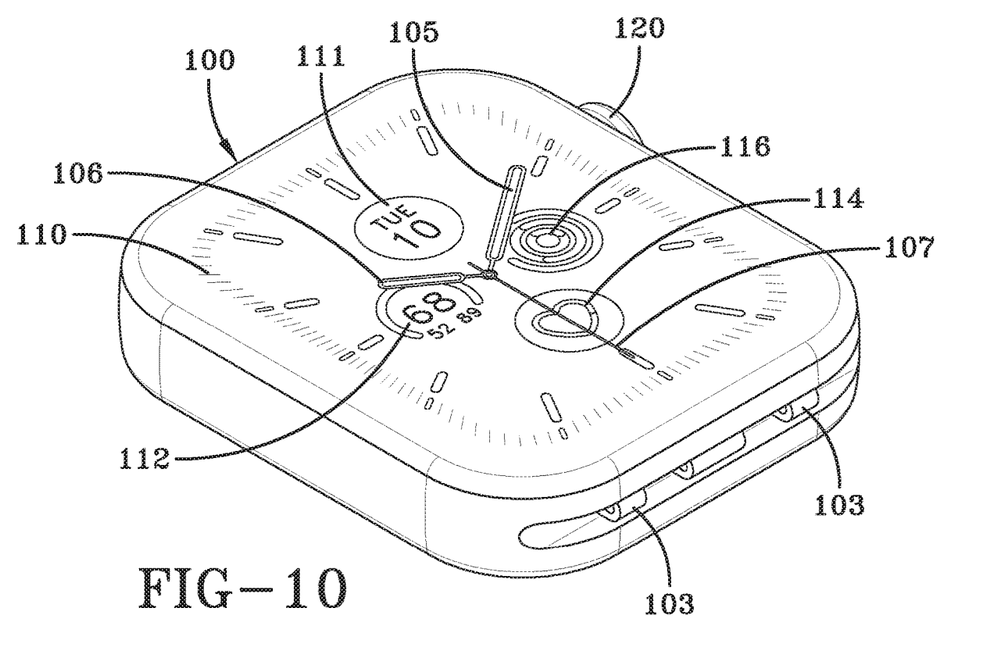
FIG. 10 is a perspective view of the face side of the exemplary watch with the charging device assembly hidden on the underside.
Figures 11A, 11B:
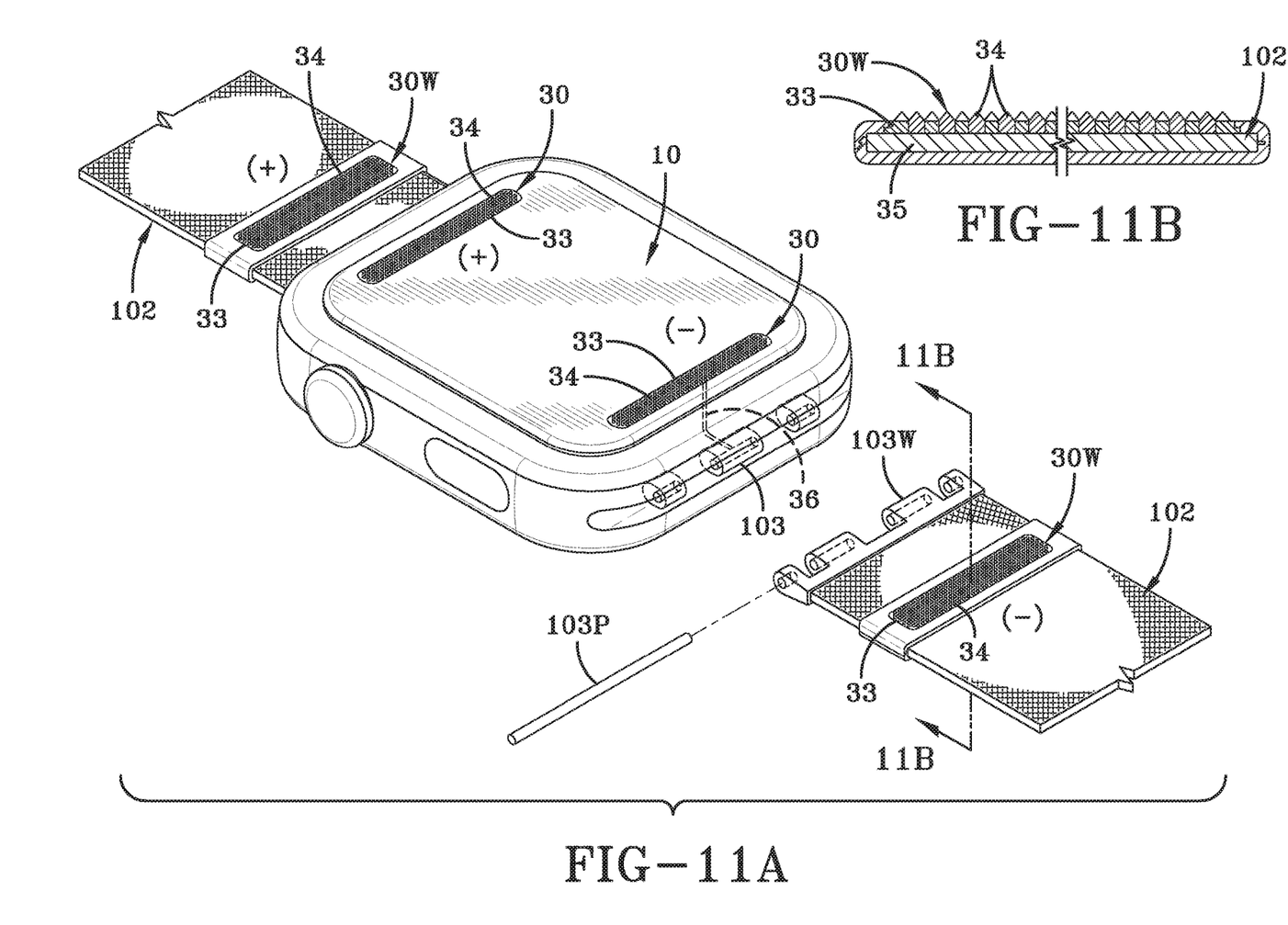
FIG. 11A is a perspective view of the watch and attachable watch band with additional conductive inserts.
FIG. 11B is a cross-sectional enlarged view of the watch band conductive insert.

As shown in FIGS. 10, 11 and 11A, an exemplary smart watch has not only the selection buttons 120, 122 or switches, it further has appendages to receive a wrist band 102, these appendages 103 provide a pinned hinge location for a wrist band 102 to be attached to a watch 100 as is commonly understood by those skilled in the art.

In FIG. 11A, the wrist band 102 can optionally be made with a conductive insert 30W having the metal conductive insert 33 with a plurality of pins 34 that can receive electric current from the wearer and pass it to the conductive strip 35 inside the band 102, shown in FIG. 11B, to a hinged end of the wrist band 102 at the attachments 103W secured by the pin 103P to appendages 103. The electric current flows from the conductive insert 30W of the wrist band 102 to the conductive insert 30 of the charging assembly 10 via the connective wire 36 as shown. This wrist band 102 provides additional surface contact to the wearer to boost the electric charge captured.

Figure 12:
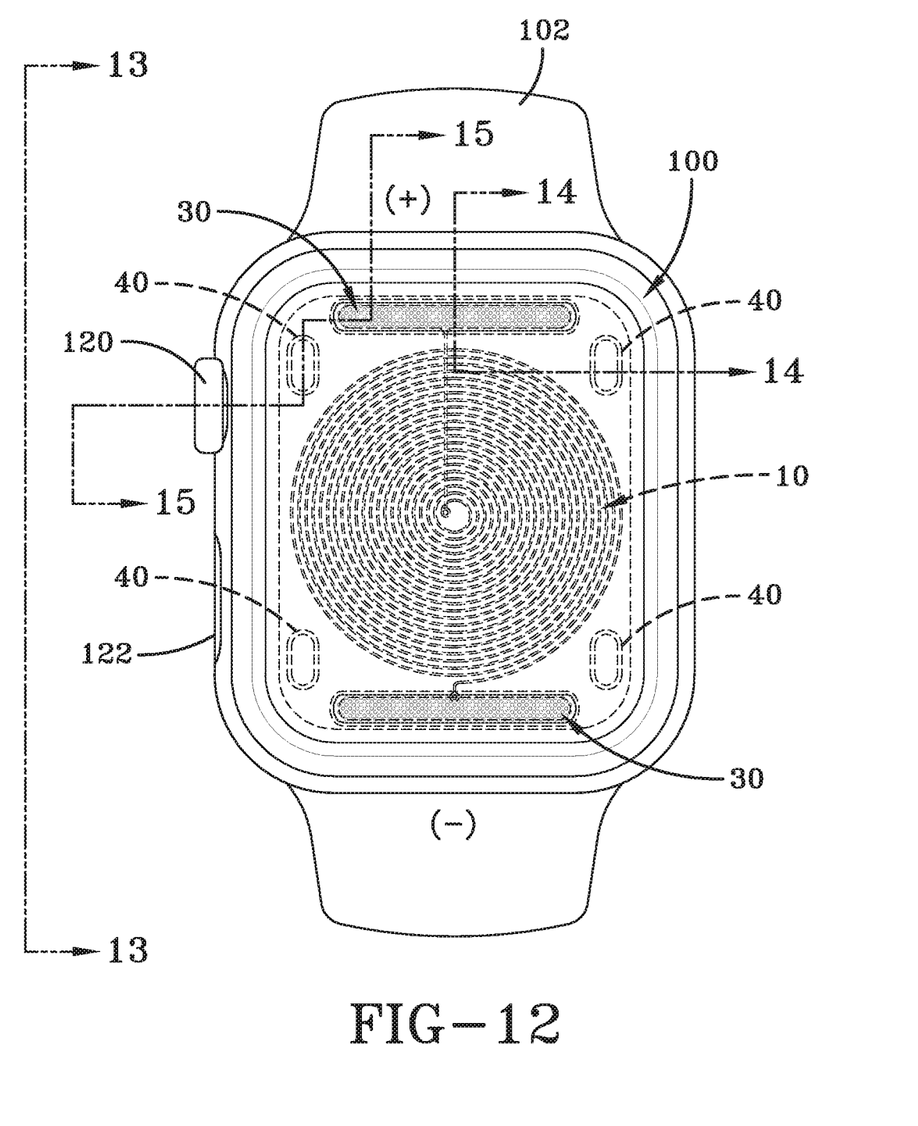
FIG. 12 is a plan view of the exemplary watch with the charging device assembly shown in dashed lines attached to the underside of the watch.

With reference to FIG. 12, when the charging assembly 10 is affixed to the bottom or underside of the watch 100 it is shown in dashed lines as it is hidden from view from any observer as illustrated in FIG. 12.

Figure 13:
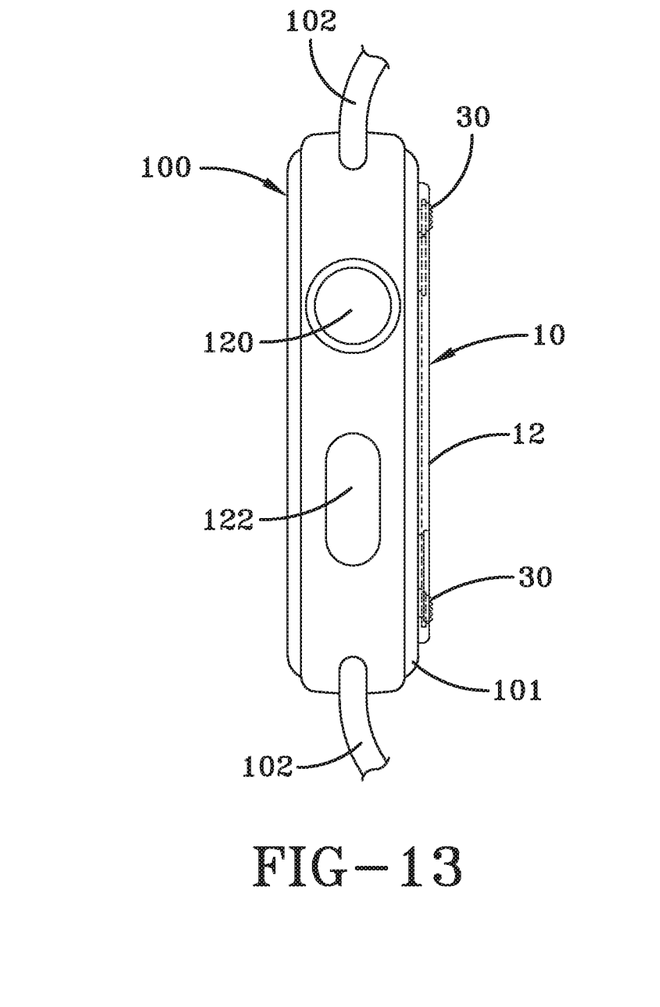
FIG. 13 is a side view of the exemplary watch and charging device along lines 13-13 taken from FIG. 12.
Figure 14:
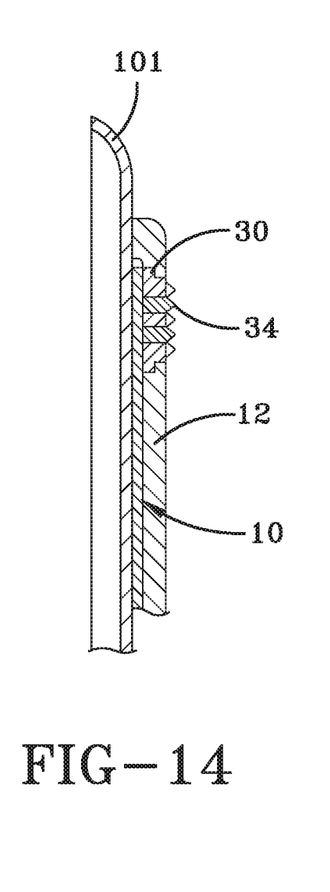
FIG. 14 is a cross sectional view of the exemplary watch and charging device along lines 14-14 taken from FIG. 12.
Figure 15:
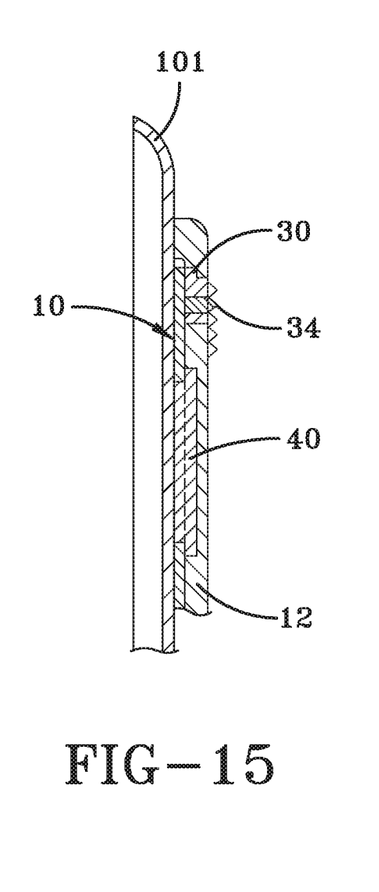
FIG. 15 is a cross sectional view of the exemplary watch and charging device along lines 15-15 taken from FIG. 12.

With reference to FIGS. 13-15 all taken from the view of FIG. 12, a side view of the watch attached to the charging assembly 10 is illustrated. In this application, the charging assembly 10 is held securely to the bottom or underside 101 of the watch 100 due to the fact that the watch has a metallic surface so that the magnets 40 create a secure attachment against the metallic surface of the watch 100 as illustrated in FIG. 15. As further shown, the charging assembly 10 is relatively thin as shown in cross section in FIG. 14, such that the back plate 12 with the pins 34 only protrude slightly from the thickness of the watch 100 itself. This is considered a first attachment embodiment wherein the magnets 40 are fully capable of being secured to the underside 101 of the watch 100 due to the metallic nature of the watch. If, for example, the watch 100 is made of a plastic bottom or underside 101 that is non responsive to magnetic fields, it is possible that an alternative embodiment should be employed to secure the charging assembly 10 to the underside of the watch 100.

Figure 16:
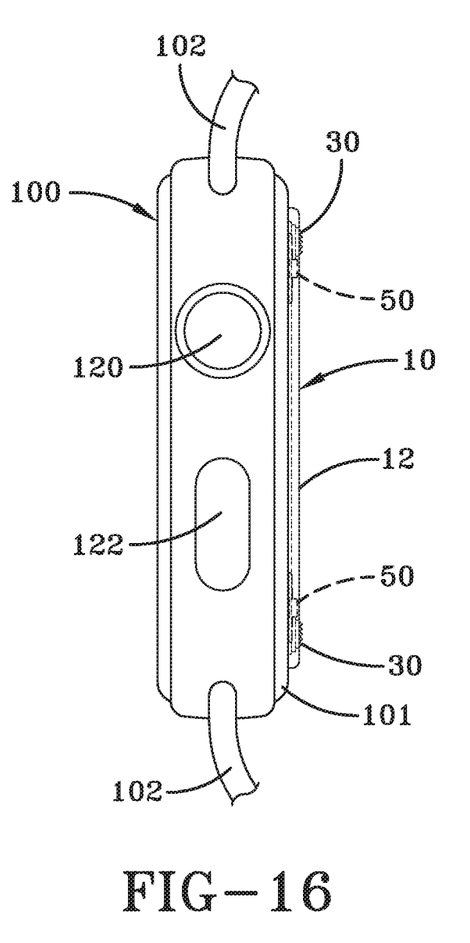
FIG. 16 is a second embodiment of the charging device assembly of the present invention illustrating suction cup elements for securing the charging device assembly to an underside of a watch.
Figure 17:
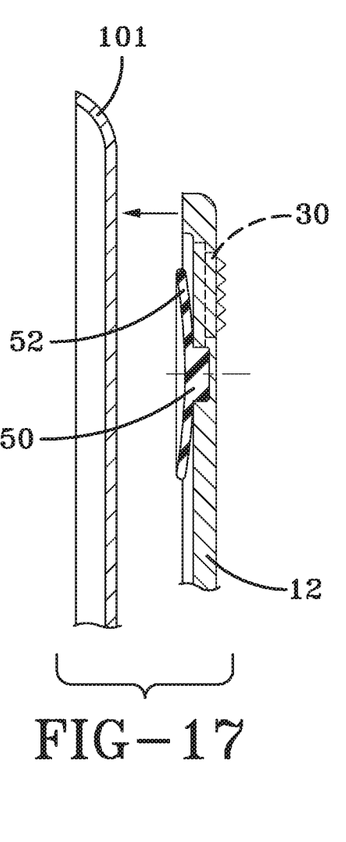
FIG. 17 is an enlarged partial view of the second embodiment showing the suction cup before being attached to the watch.
Figure 18:
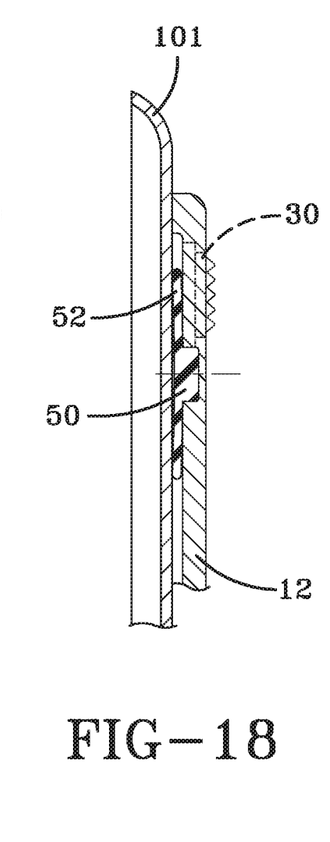
FIG. 18 is the perspective taken from FIG. 17 after the charging device assembly is pressed onto the underside of the watch as the suction cup is flattened creating a vacuum attachment.

As shown in FIGS. 16-18 a second embodiment of the invention is illustrated. All the features previously noted with regard to the first embodiment charging assembly 10 are the same in this charging assembly 10 with the exception that the magnets 40 have been replaced by suction cups 50. Four suction cups 50 are provided in this location replacing the four magnets 40. The suction cups 50, as illustrated in FIG. 17, have a cup like shape that when pressed against the underside of the watch 100, the edges 52 flatten and compress creating a vacuum holding the charging assembly 10 tightly against the underside 101 of the watch 100. This is extremely beneficial when the underside 101 of the watch 100 is not conducive to the use of magnets.

Figures 19, 20, 21, 22:
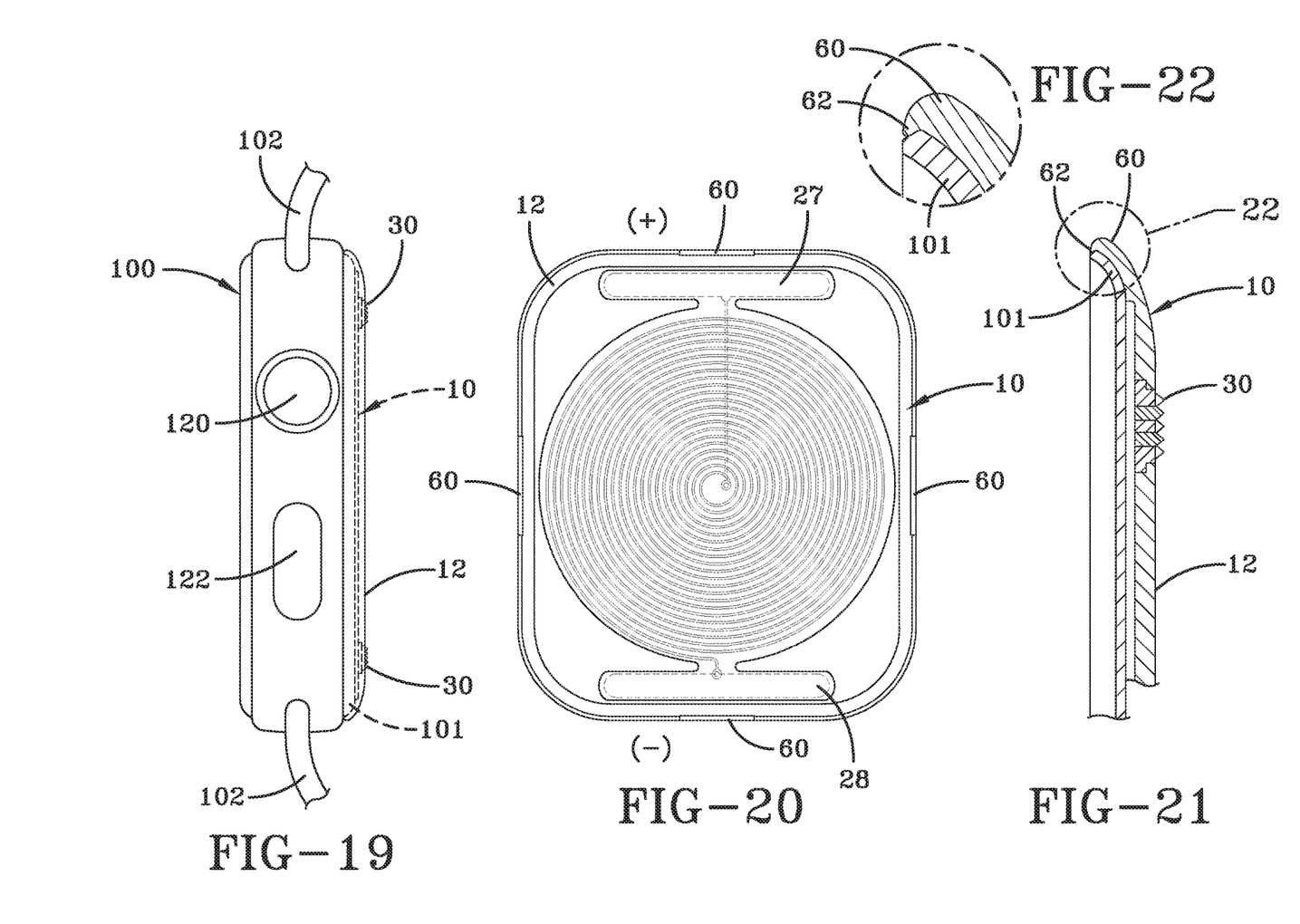
FIG. 19 is a side view of the charging device assembly of a third embodiment showing the device clipped onto the underside of an exemplary watch.
FIG. 20 is a plan view showing the back plate having a plurality of snap clip on features along a perimeter edge of the third embodiment of the invention.
FIG. 21 is an enlarged partial cross-sectional side view of the charging device of the third embodiment attached to an exemplary watch.
FIG. 22 is an enlarged view of the snap on clip feature taken from FIG. 21.

With reference to FIGS. 19-20, in a third embodiment of the invention the magnets 40 of the first embodiment and the suction cups 50 of the second embodiment have been eliminated entirely. In this third embodiment, the watch 100 is configured with a grooved or recessed edge at the underside 101 and the charging assembly 10 has the back plate 12 as shown in FIG. 20, four snap clip locations 60 around the peripheral edge of the back plate 12. The snap clip location 60 is best illustrated in FIG. 22 wherein a protrusion 62 extends to catch the recess or groove on the underside 101 of the watch 100 in such a fashion that the back plate 12 clips on in these four locations securely holding the charging assembly 10 against the underside 101 of the watch 100.

As shown, the charging assembly 10 can be provided, distributed or sold separately from any watch only to be as an add-on feature, or alternatively, can be sold with a watch as a supplemental charging means wherein the charging assembly 10 utilizes the electricity generated by the wearer through normal cellular interaction creating an electric current within the body. This electric current within the body, although extremely low, is constantly being generated, accordingly, the wearer when using a charging assembly 10 of the present invention is able to produce an electric current passing through the coil, that electric current then passing through the coil which is constructed as a pancake coil of a very low flat profile transmits energy through the coil into the underside of the watch to supplementally recharge the battery. While variations in the charging assembly 10 can be considered, it is important to note that this is an application wherein the electric current produced by the wearer of the watch supplements the charging capability of the battery within the watch and provides a means wherein a wearer, if not in a location accessible to a separate electric charging facility, can supplement his own watch charging such to extend the life of the battery. This then functions very much like "trickle chargers" that are commercially available for recharging car batteries. Even if such constant charge does not completely replace the energy use, it is anticipated that actual, external recharging of the watch battery will be needed only once a week or even less frequently.

Figure 23:
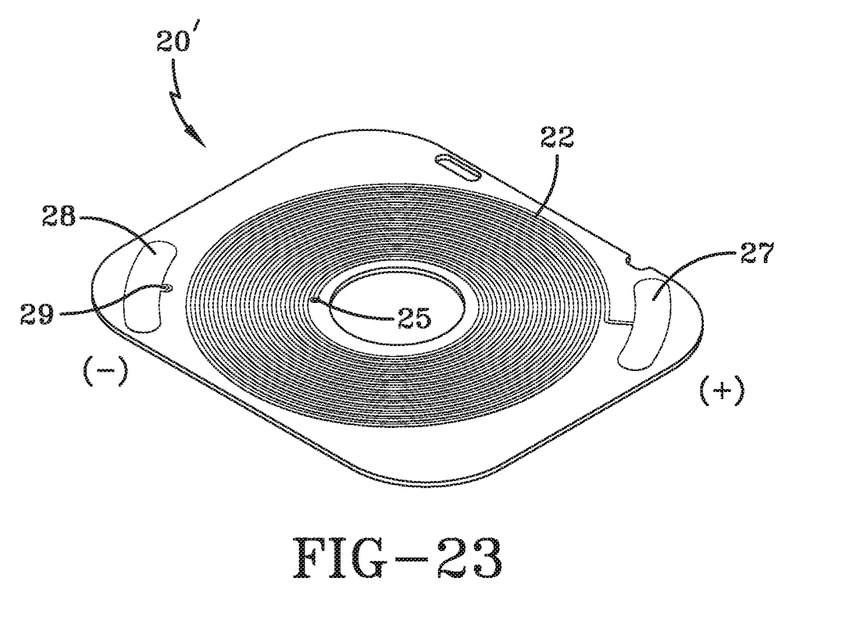
FIG. 23 is a view of an alternative watch charging assembly formed with an opening in the center for attachment to the bottom or underside of a wristwatch.
Figure 24:
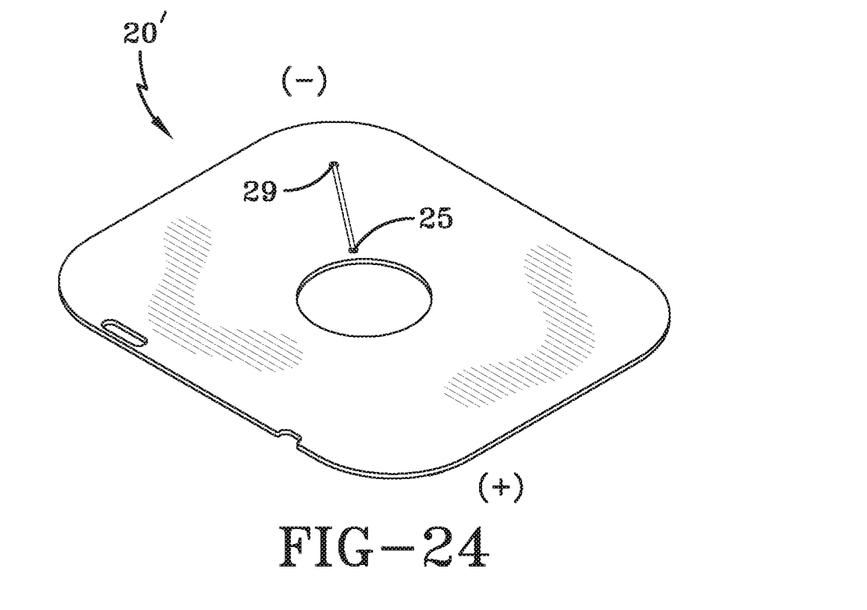
FIG. 24 is a view of the opposite side of the alternative watch charging assembly of FIG. 23 showing the pass through connection from the conductive insert to the coil.
Figure 25:
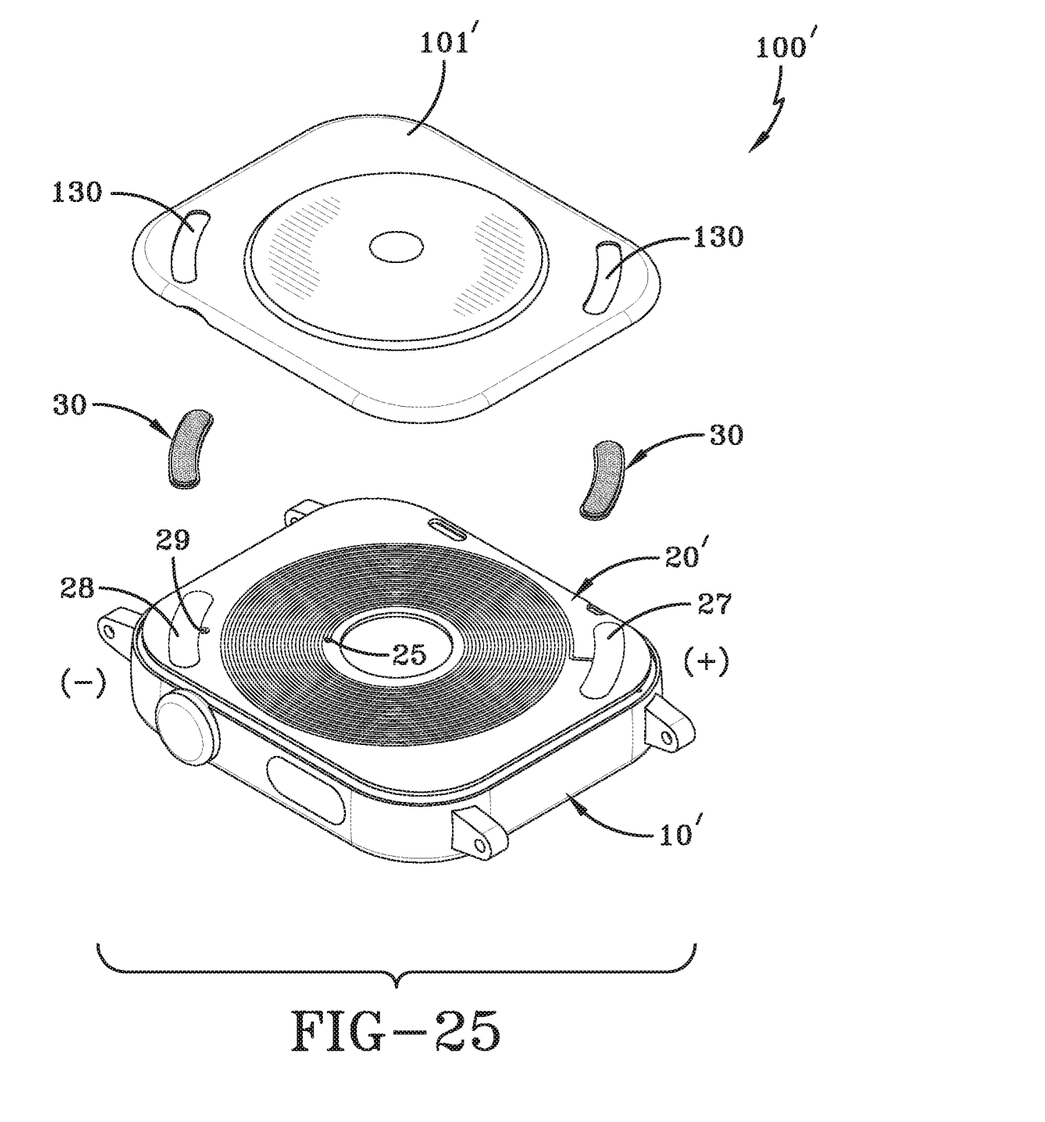
FIG. 25 is an exploded view of the alternative embodiment of charging device assembly.

In another alternative embodiment, the wrist watch 100' with the charging device 10' can be made as a unit wherein the membrane 20' has the coil 22 with the pads 27, 28 positioned on diagonally opposed corners of the watch as shown in FIG. 23. The underside or non-coil side 23 opposite the coil 22 has the first pass through connection 25 offset relative to a center opening and extending to the second pass through connection 29, as shown in FIG. 24. Similar to the previous embodiment, but with the conductive inserts 30 being arcuately curved and placed in the opposed corners. This allows the center to be open to receive any heart rate or temperature monitors commonly used in smart watches. As shown in FIG. 25, the bottom 101' of the watch casing has openings 130 to receive the conductive inserts 30 aligned with the pads 27, 28 of the membrane 20'. The center of the bottom 101' as shown is unobstructed to facilitate using the other watch functions.

In the various embodiments of the charging assembly 10, it has been shown as a feature attached to the underside of a wristwatch. It is noted that the back plate 12 itself can replace the standard back or underside of a smart watch or wristwatch 100 as shown in FIG. 23. In such a case, the assembly 10 can be a component of the wristwatch and not merely an attachment to the watch 100. Those of ordinary skill in the art would appreciate such a watch can be manufactured with all the charging features of the charging assembly 10 as illustrated herein.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described, which will be within the full intended scope of the invention as defined by the following appended claims.

What is claimed is:

1. A watch charging assembly comprising:
   a coil configured to pass electric current received at a first or second contact pad;
   a membrane affixed to the coil;
   a back plate having a pair of conductive inserts, each conductive insert aligned with and contacting each contact pad, the back plate with the coil and membrane form the watch charging assembly, wherein the coil is a pancake coil having a spirally wound wire extending from a center location or slightly offset from a center location outward to an outer location, the wire extending through a first pass through connection at or slightly offset from the center location on a first side of the membrane, the coil passes through the first pass through connection and extends to the first contact pad from the first pass through connection on a coil side of the membrane, the coil being spirally wound from the first pass through connection on the coil side of the membrane to a second pass through connection on the coil side of the membrane at the second contact pad to complete a charging circuit; and
   wherein the watch charging assembly is configured to be worn on a wearer's wrist and positioned between the wearer's wrist and a rechargeable battery operated wristwatch, the charging assembly held to a bottom or underside of the wristwatch and when worn, the watch charging assembly receives electric current from the wearer to provide a slow continuous charge to the rechargeable battery of the wristwatch.

2. The watch charging assembly of claim 1, wherein the membrane is affixed to the back plate.

3. The watch charging assembly of claim 2, wherein the membrane is glued to the back plate.

4. The watch charging assembly of claim 1 further comprises:
   a plurality of magnets configured to be positioned in the back plate along a periphery of the back plate to hold the charging assembly to the bottom or underside of the watch magnetically.

5. The watch charging assembly of claim 1 further comprises:
   a plurality of elastomeric suction cups configured to hold the charging assembly to the bottom or underside of the watch by vacuum when the suction cups are compressed against the watch.

6. The watch charging assembly of claim 1, wherein the bottom plate has a plurality of snap clips around an edge of the bottom plate configured to be attached to a watch with edges or grooves configured to receive the snap clips to attach the assembly to the watch.

7. The watch charging assembly of claim 1, wherein the back plate has a pair of holes for receiving the conductive inserts, each hole sized to receive one of the conductive inserts.

8. The watch charging assembly of claim 7, wherein each conductive insert comprises:
   a non-metal housing extending around a perimeter of the conductive insert and configured to fit into the holes of the back plate; and
   a metal conductive portion configured to contact a wearer's skin.

9. The watch charging assembly of claim 1, wherein the metal conductive portion has a plurality of pins, each pin projecting from the metal portion to a tip end to increase contact intensity at the skin.

10. The watch charging assembly of claim 9, wherein the pins of the plurality of pins are closely spaced to share the contact pressure at the skin.

11. The watch charging assembly of claim 1, wherein the coil is hermetically sealed in the membrane.

12. The watch charging assembly of claim 1, wherein the contact pads of the coil are engaged and in contact with the metal portion of the conductive inserts to pass electric current into the coil.

13. The watch charging assembly of claim 1, wherein the metal conductive portion of the inserts is made of highly conductive metal.

14. The watch charging assembly of claim 13, wherein the highly conductive metal is one of copper, gold, gold plated metal, silver or other conductive metallic material.

15. The watch charging assembly of claim 1, wherein the back plate is made of non-conductive plastic.

16. The watch charging assembly of claim 1, wherein the charging assembly is configured to attach to a smart wristwatch configured to be wirelessly charged by a coil.

17. A watch with a built-in charging assembly comprises:
   a watch with a rechargeable battery and configured to be recharged through an inductive coil; and
   a watch charging assembly having:
   a coil configured to pass electric current received at a first or second contact pad;
   a membrane affixed to the coil;
   a back plate having a pair of conductive inserts, each conductive insert aligned with and contacting each contact pad, the back plate with the coil and membrane form the charging assembly, wherein the coil is a pancake coil having a spirally wound wire extending from a center location or slightly offset from a center location outward to an outer location, the wire extending through a first pass through connection at or slightly offset from the center location on a first side of the membrane, the coil passes through the first pass through connection and extends to the first contact pad from the first pass through connection on a coil side of the membrane, the coil being spirally wound from the first pass through connection on the coil side of the membrane to a second pass through connection on the coil side of the membrane at the second contact pad to complete a charging circuit; and
   wherein the charging assembly is configured to be a bottom or underside of a rechargeable battery operated wristwatch, and when worn, the charging assembly receives electric current from the wearer to charge the rechargeable battery of the wristwatch.

18. The watch with a built-in charging assembly of claim 17 further comprises:
   a wrist band configured to be attached to opposite ends of the watch, the wrist band having a pair of bands, each band having a conductive insert to receive electric current.

* * * * *